Jan. 28, 1930.    R. J. WENSLEY    1,745,072
SUPERVISORY CONTROL SYSTEM
Filed Nov. 28, 1923    4 Sheets-Sheet 1

Fig. 1

WITNESSES:

INVENTOR
Roy J. Wensley
BY
ATTORNEY

Jan. 28, 1930.  R. J. WENSLEY  1,745,072
SUPERVISORY CONTROL SYSTEM
Filed Nov. 28, 1923  4 Sheets-Sheet 2

Fig. 2

WITNESSES:

INVENTOR
Roy J. Wensley
BY
ATTORNEY

Jan. 28, 1930.  R. J. WENSLEY  1,745,072
SUPERVISORY CONTROL SYSTEM
Filed Nov. 28, 1923   4 Sheets-Sheet 4

Fig. 4

WITNESSES:

INVENTOR
Roy J. Wensley
BY
ATTORNEY

Patented Jan. 28, 1930

1,745,072

UNITED STATES PATENT OFFICE

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA

SUPERVISORY CONTROL SYSTEM

Application filed November 28, 1923. Serial No. 677,565.

My invention relates to supervisory control systems, and particularly to supervisory control systems of the relay type, for controlling electrical equipment from a remote point.

One object of my invention is to provide equipment of novel and efficient design at a central point for supervising and controlling the apparatus units in various stations of an electrical distributing system.

Another object of my invention is to provide an all-relay system for supervising and controlling power-apparatus units in automatic stations.

Another object of my invention is to provide a system that shall have an increased operating speed.

Still another object of my invention is to provide control and supervisory equipment of such nature that it may be used for a system of any size and, in the case of an enlargement in the system, the cost of the apparatus added will be only nominal and in accordance with the number of added units it is desired to control and supervise.

One of the systems heretofore provided for the control and supervision of the apparatus units located at remote stations employed a switching mechanism similar to that used for extending calls in automatic telephone systems.

In another system, the power apparatus was controlled and supervised from a central point by the use of all relay selection. In the latter case, the methods of control and supervision, besides being more or less unreliable, required considerable time to function.

In view of the above, I have provided a relay-controlled supervisory system that shall be reliable and have a greater speed of operation.

In the accompanying drawings, comprising Figures 1 to 4, inclusive, is shown, by means of conventional circuit diagrams, apparatus for controlling, from a control office, a number of apparatus units in a station or substation of the system.

Figs. 1 and 3 show the apparatus in the control or dispatcher's office, while

Sufficient equipment has been shown to control and supervise three apparatus units or circuit breakers, as are here illustrated, at the substation. The system may be enlarged to control and supervise a greater number of apparatus units in a manner which will appear later.

The substation controlled by the apparatus shown may be either manual or automatic. In the present instance, it is assumed that the substation is automatic. The automatic control devices have not been shown but, as their function and construction are well known, a description thereof is not essential to an understanding of the present invention.

Figure 1:
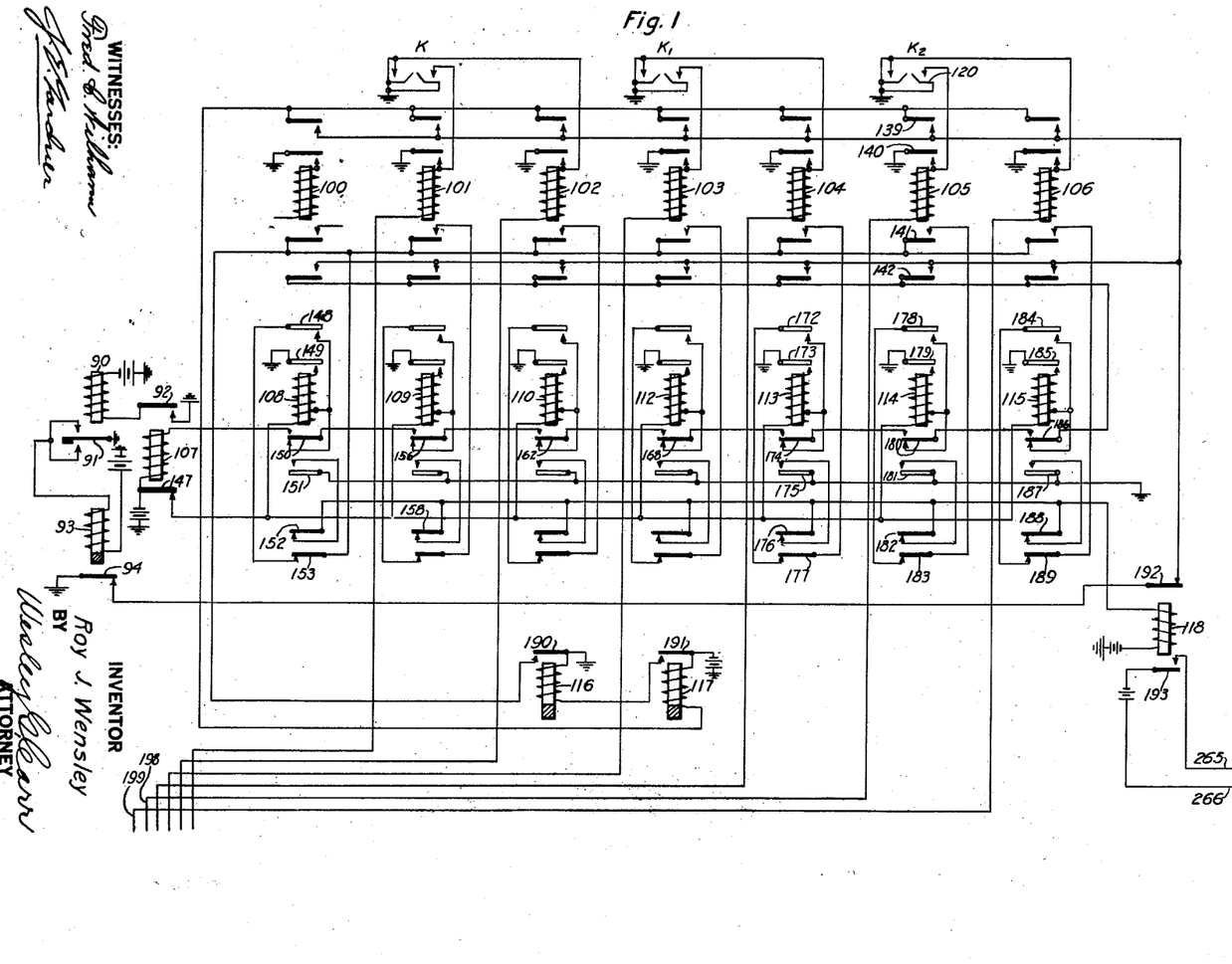

Referring now more particularly to Fig. 1, keys K, K—1 and K—2 of the ordinary double-throw type, common in telephone systems, are provided. Relays 101 and 102, 103 and 104 and 105 and 106 are associated with the keys K, K—1 and K—2, respectively. Every other key in the dispatcher's office has two similar relays associated with it. Relays 108 to 115, inclusive, are counting relays and are adapted to control the selection of the particular relay in the relay groups 100 to 106 that is operated. At the same time, this counting relay group controls the operation of a sending relay 118. Relays 90, 93, 107, 116 and 117 control the functioning of the counting relay group. These counting relays are provided with a lower winding that has relatively few ampere turns. With the lower winding alone energized, the counting relays are adapted to cause certain armatures to engage their front contacts and, when both windings are energized to operate all the armatures of the relay. The armatures that are adjusted to operate when the lower winding alone is energized, are shown in the shape of a hollow rectangle, while the armatures that operate when both windings are energized are illustrated by a solid rectangle.

Figure 2:
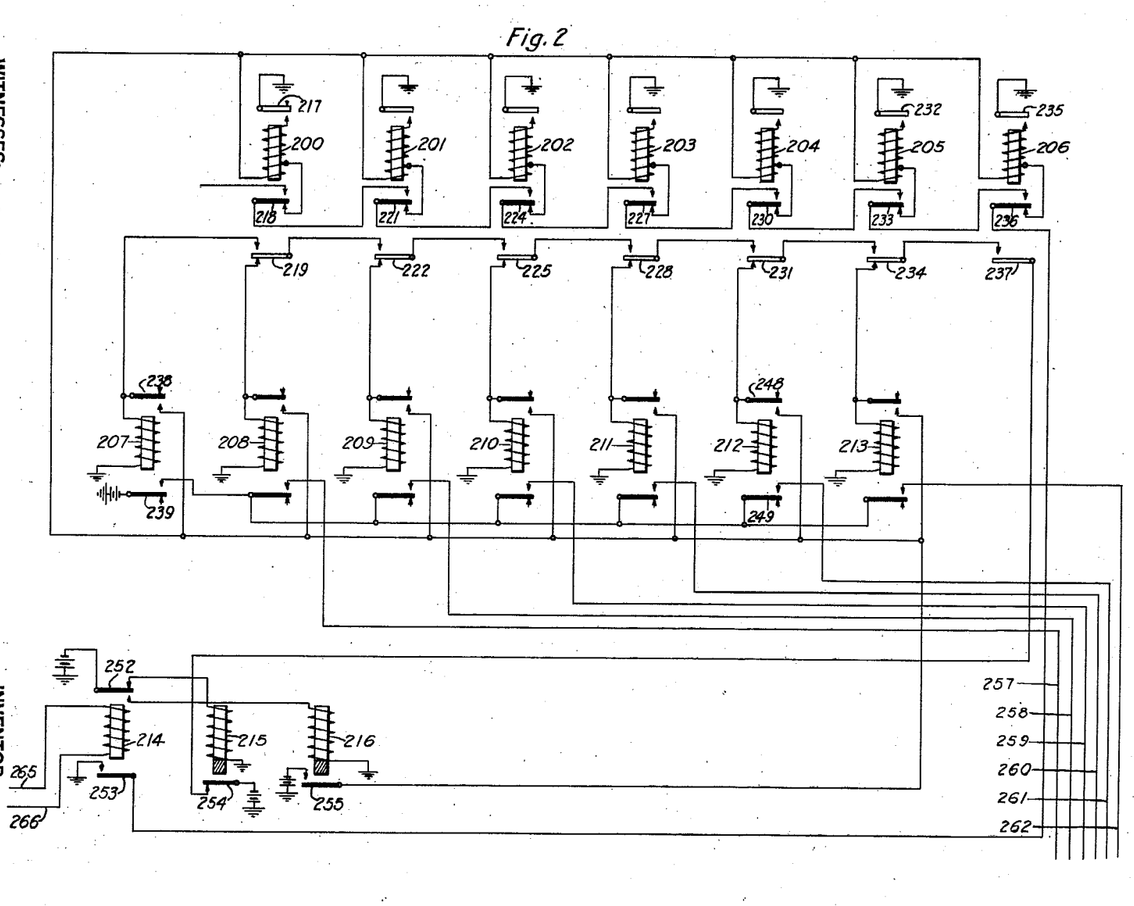
Figs. 2 and 4 show the apparatus in the substation.

In Fig. 2, the relays 200 to 206, inclusive, are counting relays that are adapted to control the relays 207 to 213, inclusive. In the case of the counting relay group 200 to 206, the relays are of the same construction as has been described in connection with relays 108 to 113, inclusive, shown in Fig. 1. The armatures that are adapted to be attracted when the lower winding alone is energized may be distinguished by their hollow rectangular showing. The relays 207 to 213, inclusive, control the circuit breakers C, C—1 and C—2, shown in Fig. 4. The counting relays are controlled by relays 214, 215 and 216.

Figure 3:
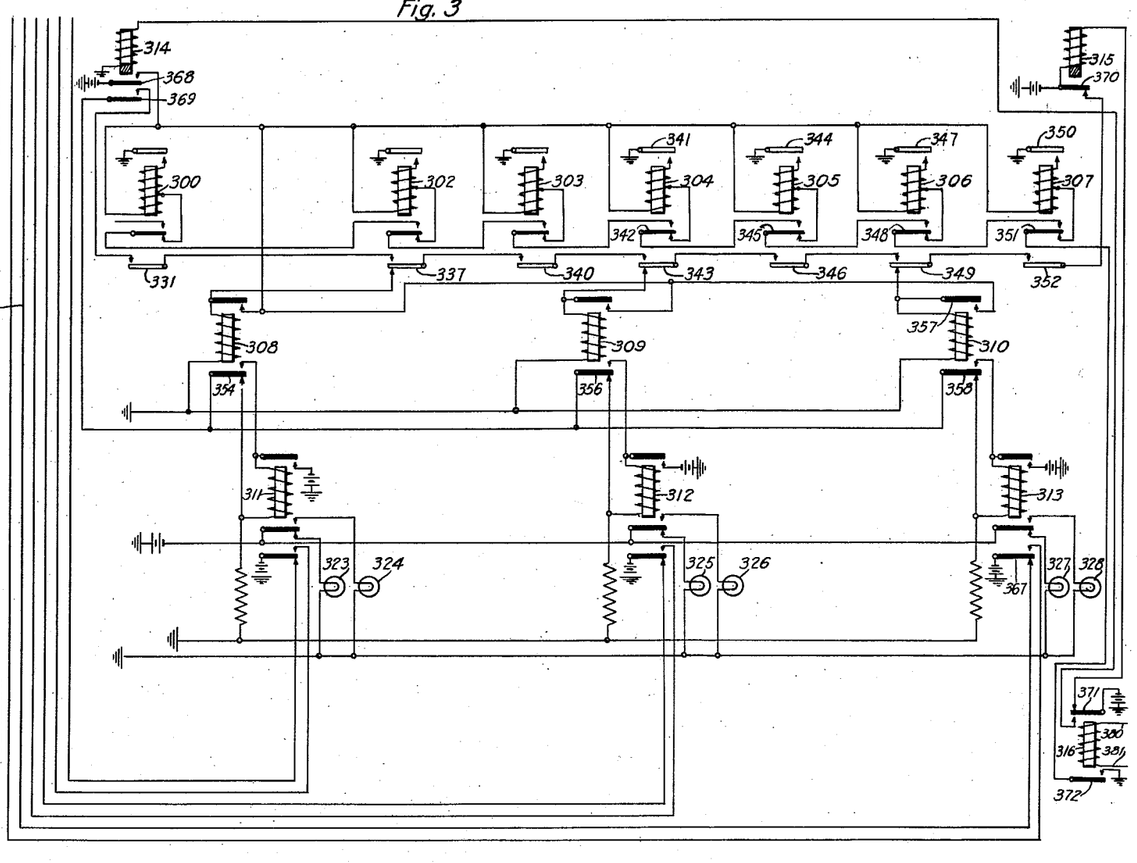

In Fig. 3, counting relays 300 to 307, inclusive, are adapted to control lamp relays 308 to 310, inclusive. Relays 311 to 313 are lamp-control relays that control supervisory lamps 323 to 328, inclusive. The counting relays are similar in construction to those previously described and are adapted to be operated in the proper manner by relays 314 to 316, inclusive.

Figure 4:
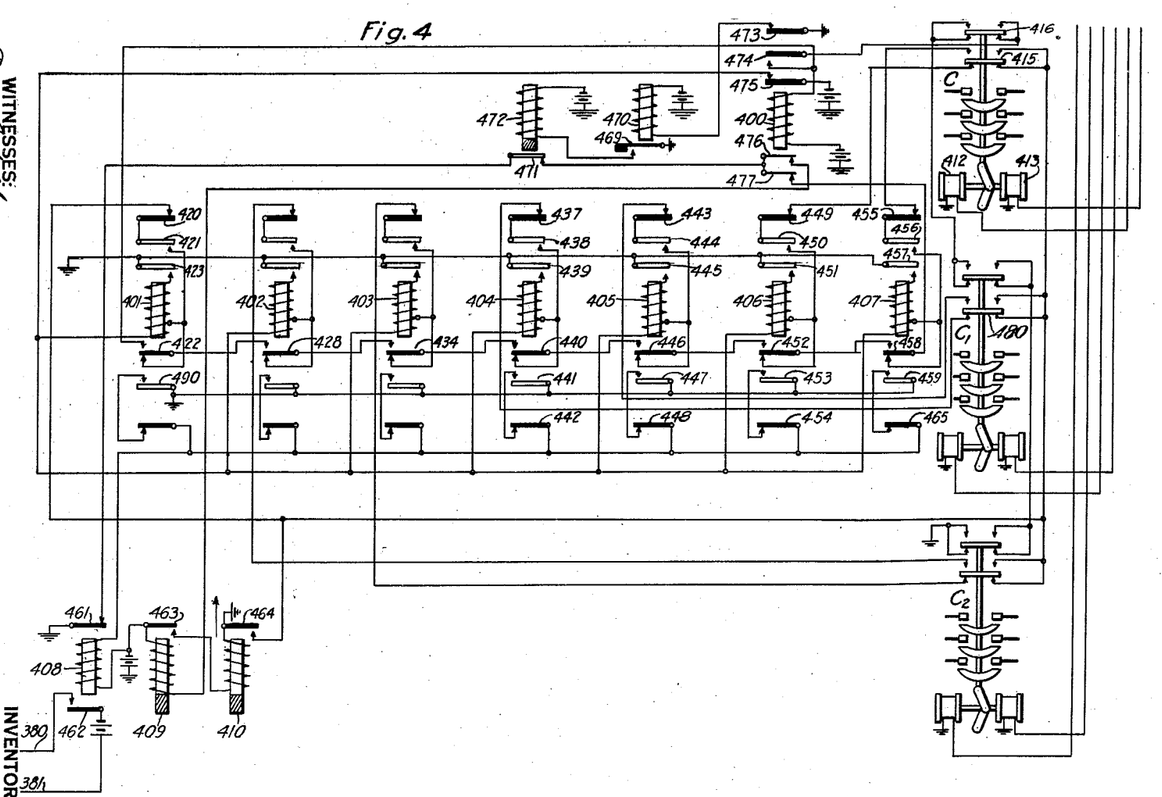

Referring now to Fig. 4, relays 401 to 407, inclusive, are counting relays, which are adapted to be controlled by relays 408 to 410, inclusive, and the relays 472, 470 and 400. The circuit breakers C, C—1 and C—2 are ordinary circuit breakers that may close circuits for translating devices or other apparatus units in any well-known manner.

The apparatus shown in the drawings having been briefly described its operation will now be set forth in detail. For this purpose, it will be assumed that the dispatcher desires to close the circuit breaker C at the substation. In order to accomplish this result, the dispatcher will operate the key K—2 in such direction as to force the spring 120 into engagement with its working contact. As a result of this operation, a circuit is closed extending from ground by way of said spring and its working contact, through the winding of the relay 105, the conductor 198, the back contact and the armature 367 on the relay 313 and thence to battery. The lamp relay 313 is deenergized at this time and the lamp 327 is lighted to inform the dispatcher that the apparatus unit (circuit breaker C) at the substation is open.

The relay 105 is energized over the above circuit and, upon operating, at armature 140, establishes a locking circuit for itself and, at its armature 139, completes a circuit which extends from ground by way of the armature 94 and its back contact, the armature 192 and its back contact, the front contact and armature 139, and, through the winding of the slow-release relay 117, to battery. Upon being energized, the relay 117, at armature 191, completes a circuit for the slow-release relay 116. The relay 116, upon being energized, at armature 190, places ground, by way of the armature 141 and its front contact and the armature 183 and its back contact, on the armature 178 of the second counting relay 114.

Another result of the energization of the relay 105 is that, at armature 142, a circuit is completed extending from ground by way of the armature 94 and its back contact, the armature 192 and its back contact, the front contact and armature 142, the armature 186 and its back contact, through the lower winding of the counting relay 115, and thence to battery by way of the back contact and the armature 147.

With the lower winding of the relay 115 energized, the armatures 184, 185 and 187 are caused to engage their front contacts. The operation of the armature 185 prepares a locking circuit for the counting relay 115, including its upper winding, which is not effective until the above traced circuit for the lower winding is opened. The operation of the armature 187 of the counting relay 115 closes a circuit that extends from ground by way of the armature 187 and its front contact, the back contact and the armature 188, and, through the winding of the repeating relay 118, to battery. The repeating relay 118 is energized over this circuit and operates, at its armature 192, to remove the short-circuit from the upper winding of the relay 115, and, at armature 193, completes a circuit over trunk conductors 265 and 266 for the line relay 214 in the receiving device at the substation.

When the short-circuit is removed from the upper winding of the relay 115, the armatures 186, 188 and 189 are operated. As a result of this operation, the circuit of the repeating relay 118 is opened at armature 188, at armature 189 one point in the circuit for placing ground on armature 184 is opened, and, at armature 186, a circuit is prepared for the lower winding of the relay 114. As its circuit is opened, the relay 118 is immediately deenergized, thereby opening the circuit of the line relay 214 at the substation at armature 193, and, at armature 192, completes a circuit that extends from ground by way of said armature and its back contact, the front contact and the armature 142, the armature 186 and its front contact, armature 180 and its back contact, through the lower winding of the second counting relay 114, and thence to battery by way of the back contact and armature 147.

At the substation, when the relay 214 is energized, the circuit of the slow-release relay 215 is opened and a circuit is closed for the slow-release relay 216. The relay 216 immediately energizes to prepare circuits for the windings of the relays 200 to 206, inclusive. Another result of the energization of the relay 214 is that, at armature 253, a circuit is completed extending from ground by way of the front contact and the said armature, armature 236 and its back contact, through the lower winding of the first counting relay 206, and thence to battery by way of the armature 255 and its front contact. When the lower winding of the relay 206 is energized, the armatures 235 and 237 are attracted, whereby a circuit is prepared for the upper winding of the relay 206 and a circuit is prepared for the relay 213, respectively. The circuit for the upper winding of relay 206 is ineffective so long as the previously traced circuit for the lower winding is completed, inasmuch as the upper winding is short-circuited.

Upon the deenergization of the repeating relay 118 at the dispatcher's office, the relay 214 deenergizes to open the circuit of the slow-release relay 216 at armature 252, and, at the same armature 252, completes a circuit for the relay 215. In addition, the retraction of the armature 253 of the relay 214 removes the short-circuit from the upper winding of the relay 206, and this relay completely operates to prepare a circuit for the lower winding of the relay 205 at the armature 236.

In the dispatcher's office, when the circuit of the lower winding of the second counting relay 114 is completed, as previously described, the armatures 178, 179 and 181 are brought into engagement with their working contacts. As a result of this operation, a circuit is prepared at armature 179 for the upper winding of the said relay from ground, armature 179 and its contact, winding of relay 114, contact and armature 147, battery to ground. At armature 181 a circuit is closed for the repeating relay 118, and at the armature 178 a locking circuit is completed for the lower winding of the relay 114, which extends from ground by way of the armature 190 and its front contact, armature 141 and its front contact, armature 183 and its back contact, armature 178 and its front contact, through the lower winding of the relay 114, and thence to battery by way of the back contact and armature 147. The repeating relay 118, upon being energized, opens the original energizing circuit for the lower winding of the second counting relay 114 at armature 192. However, this relay does not fully energize at this time, by reason of the fact that its lower winding is energized and, consequently, the upper winding is short-circuited by the above traced locking circuit. The operation of the armature 192 does, however, open the circuit of the slow-release relay 117. In addition, the operation of the armature 193 completes a circuit for the relay 214 at the substation. It will be seen that the repeating relay 118 remains energized until the relay 114 completely operates, which occurs when the slow-release relay 116 is deenergized, and also an interval after the de-energization of the slow-release relay 117.

At the substation, the relay 214, upon energizing at armature 253, completes a circuit by way of said armature and its front contact, the front contact and the armature 236, armature 233 and its back contact, through the lower winding of the second counting relay 205, and thence to battery by way of the armature 255 and its front contact. The counting relay 205 operates to attract the armature 232, thereby preparing a circuit for its upper winding, and the armature 234, whereby a circuit is prepared for the relay 212. However, inasmuch as the repeating relay 118 at the dispatcher's office is maintained energized until after the deenergization of the two slow-acting relays 117 and 116, the relay 214 at the substation is maintained operated for this interval and, consequently, the slow-release relay 215 will be deenergized, its circuit being open an undue length of time. The slow-release relay 215, during the normal operation of the system, when the armature of the line relay 214 is vibrating, normally maintains this armature attracted, as does the slow-release relay 216. During the prolonged interval that the relay 214 is maintained energized the armature 254 is retracted and a circuit is completed extending from battery by way of the said armature and its back contact, armature 237 and its front contact, armature 234 and its front contact, and, armature 231 and its back contact, through the winding of the relay 212, to ground. The relay 212 is immediately energized to establish a locking circuit for itself at armature 248 from ground, winding of relay 212, armature 248 and its front contact, armature 255 and its front contact, battery to ground, and to prepare a circuit at armature 249 for the closing coil 413 of the circuit breaker C.

In the dispatcher's office, upon the deenergization of the relay 116, the short-circuit is removed from the upper winding of the relay 114 and this winding becomes immediately effective to operate the armatures 180, 182 and 183. As a result of this, the circuit of the repeating relay 118 is opened at the armature 182, at the armature 183, a point in the locking circuit for the lower winding of the relay 114 is opened, and, at the armature 180, a circuit is prepared for the lower winding of the third counting relay 113. The relay 118, upon deenergization, at its armature 192, completes a circuit for the slow-release relay 117, which is energized to close the circuit of the slow-release relay 116. The operation of the armature 193 of the relay 118 opens the circuit of the line relay 214 at the substation. When the relay 116 is energized, a circuit is closed for the lower winding of the counting relay 113.

As a result of the deenergization of the relay 214 at the substation, the slow-release relay 215 is again energized and the short-circuit is removed from the upper winding of the second counting relay 205. This relay immediately operates to attract the armature 233. As a result of this operation, a circuit is prepared for the lower winding of the counting relay 204.

At the dispatcher's office, the energization of the lower winding of the relay 113 attracts the armatures 172, 173 and 175. This operation, as before, completes a circuit for the repeating relay 118, prepares a circuit for the upper winding of relay 113 and also prepares a locking circuit for the lower winding of said relay. As the key K—1 is not closed, the latter operation is without function at the present time.

The operation of the relay 118 removes the short-circuit from the upper winding of relay 113 and closes a circuit for the line relay 214 of the receiving device at the substation. When the short-circuit is removed from the upper winding of the relay 113, this relay completely operates to attract the armatures 174, 176 and 177, thereby opening certain circuits and preparing a circuit for the lower winding of the relay 112. This alternate operation of the repeating relay 118 and the counting relays 112, 110, 108 and 109 continues until all the counting relays have been operated, the relay 214 at the substation being operated for each operation of a counting relay and also a corresponding counting relay of the relays 203, 202 and 201.

Assuming that the counting relay 109 is the last relay on the counting relay chain associated with the various keys, when this relay is completely operated, a circuit is prepared at armature 156 for the lower winding of the counting relay 108, and, at armature 158, the circuit of the repeating relay 118 is opened. The repeating relay 118 deenergizes to open the circuit of the line relay 214 at the substation at armature 193, and, at armature 192, completes a circuit extending from ground by way of armature 94 and its back contact, armature 192 and its back contact, the front contact and armature 142, armature 186 and its front contact, armature 180 and its front contact, armature 174 and its front contact, armature 168 and its front contact, armature 162 and its front contact, armature 156 and its front contact, armature 150 and its back contact, through the lower winding of the relay 108, and thence to battery by way of the back contact and armature 147. The energization of the lower winding of relay 108 causes the operation of the armatures 148, 149 and 151. The operation of armature 149 prepares a circuit for the upper winding of the relay 108, and the operation of the armature 148 establishes a locking circuit for the lower winding of said relay extending from ground by way of armature 190 and its front contact, armature 153 and its back contact, armature 148 and its front contact, through the lower winding of relay 108, and to battery by way of the back contact and armature 147. The operation of the armature 151 of the relay 108 also closes a circuit for the repeating relay 118 which energizes to open the original energizing circuit for the lower winding of said relay and to close a circuit for the line relay 214 of the receiving device at the substation.

At the substation, the energization of the relay 214 opens the circuit of the slow-release relay 215 and closes a circuit for the relay 216 at armature 252, and, at armature 253, completes a circuit extending from ground by way of the armature 253 and its front contact, armature 236 and its front contact, armature 233 and its front contact, armature 230 and its front contact, armature 227 and its front contact, armature 224 and its front contact, armature 221 and its front contact, armature 218 and its back contact, through the lower winding of the relay 200, and thence to battery by way of armature 255 and its front contact. The lower winding of the relay 200 is energized and the armatures 217 and 219 are operated.

When the relay 215 is deenergized, which occurs after an interval, by reason of the relay 118 at the dispatcher's office being maintained energized until the relays 116 and 117 retract their armatures, a circuit is completed extending from battery by way of armature 254 and its back contact, armature 237 and its front contact, armature 234 and its front contact, armature 231 and its front contact, armature 228 and its front contact, armature 225 and its front contact, armature 222 and its front contact, armature 219 and its front contact, and through the winding of the relay 207, to ground. The relay 207 is energized over this circuit and, upon operating, at armature 238, establishes a locking circuit for itself and, at armature 239, completes a circuit extending from battery by way of said armature and its front contact, armature 249 and its front contact, conductor 261, and through the winding of the closing coil 412 of the circuit breaker C, to ground.

Returning now to the operation at the dispatcher's office, when the relay 116 is deenergized, the short-circuit is removed from the upper winding of the relay 108 and this relay attracts the armatures 150, 152 and 153. As a result of this operation, the circuit of the repeating relay 118 is opened, and this relay is deenergized to open the circuit of the relay 214 at the substation at armature 193 and also to complete a circuit extending from ground by way of the back contact and the armature 94, the back contact and the armature 192, the front contact and armature 142, armature 186 and its front contact, the armature 180 and its front contact, armature 174 and its front contact, armature 168 and its front contact, armature 162 and its front contact, armature 156 and its front contact, armature 150 and its front contact, and, through the winding of the relay 107, to battery.

The relay 107 is energized over this circuit and, upon attracting its armature 147, opens the locking circuits of all the counting relays 108 to 115, inclusive, whereby these relays retract their armatures. Another result of the energization of the relay 107 is that, at armature 92, a circuit is completed for the relay 90. This relay, upon operating, closes a circuit for the slow-release relay 93. The relay 117 is deenergized upon the deenergization of the counting relays.

At this point, it may be well to mention the peculiar construction of the armature 91 of the relay 90. The armature 91 is weighted at one end and so constructed that, upon the deenergization of the relay, sufficient momentum will be given to the armature to enable it to vibrate for an interval of time thereafter, thus sending a series of impulses to the slow-release relay 93.

When the armature 91 finally comes to rest, the circuit of the slow-release relay 93 is opened and this relay is deenergized after an interval of time. When the relay 93 first operates, ground is removed from the armature 192 of the repeating relay 118. Upon the deenergization of the relay 93, the ground is again placed upon the said armature. As a result of this operation, the sending operation does not recur for an interval of time sufficiently long to permit the slow-release relay 216 at the substation to retract its armature, after the deenergization of the relay 214.

Referring now to the apparatus at the substation, in the deenergized condition of the relay 214, the circuit of the slow-release relay 216 is opened and this relay is deenergized after an interval of time to open the locking circuits of the counting relays 200 to 206, inclusive, and the relays 207 to 213, inclusive. In this manner, the apparatus at the substation is released in response to the sending of the code.

The time constant of the relay 216 is so adjusted that the above traced circuit for closing the circuit breaker C is maintained long enough to perform the breaker-closing operation, inasmuch as the circuit of the closing coil 410 is opened by the deenergization of the relay 213.

It will be noted that the circuit breaker C, upon operating, operates the switch 416, whereby the locking circuit of the relay 400 is momentarily opened. The relay 400 is in an operated condition at this time, by reason of the fact that it has been energized by the operation of the last counting relay 401 that occurred during the preceding operation of the device. As the locking circuit of the relay 400 is opened, this relay is deenergized and retracts its armatures. Responsive to this operation, a circuit is closed extending from ground by way of the armature 461 and its back contact, armature 471 and its back contact, armature 476 and its back contact, and, through the winding of the slow-release relay 409, to battery. Upon operating, the relay 409, at armature 463, closes a circuit for the slow-release relay 410. Another result of the deenergization of the relay 400 is that, at armature 473, a circuit is completed for the relay 470. Upon operating, the relay 470 retracts its armature 469. The armature 469 has a peculiar structure that is similar to that of the armature of the relay 90 previously described.

Still another result of the deenergization of the relay 400 is that, at armature 477, a circuit is completed extending from ground by way of armature 461 and its back contact, armature 471 and its back contact, armature 477 and its back contact, armature 458 and its back contact, through the lower winding of the relay 407, and thence to battery by way of the back contact and armature 475.

With its lower winding energized, the relay 407 attracts the armatures 456, 457 and 459. As a result of the operation of the armature 459, a circuit is completed extending from ground by way of the said armature and its front contact, the back contact and armature 465, through the winding of the repeating relay 408 to battery. The operation of the armature 457 prepares a circuit for the upper winding of the relay 407, but this circuit is not effective for the present. The operation of the armature 456 closes a locking circuit for the lower winding of the relay 407 which extends from ground by way of the armature 464 and its front contact, by way of the switch 415 in its closed position, the back contact and the armature 455, the armature 456 and its front contact, through the lower winding of the first counting relay 407, and thence to battery by way of the armature 475 and its back contact.

When the repeating relay 408 is energized over the previously traced circuit, a circuit is completed at armature 462 for the line relay 316 at the dispatcher's office over the line conductors 380 and 381 in series. Also, at armature 461, the original energizing circuit for energizing the lower winding of the relay 407 is opened. However, the short-circuit is not removed from the upper winding of the relay 407 by this operation, by reason of the previously traced locking circuit for the lower winding. The operation of the relay 408 also opens the circuit of the slow-release relay 409. The slow-release relay 409, in turn, opens the circuit of the slow-release relay 410. The slow-release relay 410 is deenergized after an interval and removes the short-circuit from the upper winding of the relay 407, permitting it to attract the armatures 455, 458 and 465.

At the dispatcher's office, the energization of the relay 316 closes a circuit for the relay 314 at armature 371, and, at this armature, opens the circuit of the slow-acting relay 315, and, at armature 372, completes a circuit which extends from ground by way of the front contact and said armature, armature 351 and its back contact, through the lower winding of the relay, and the front contact and armature 368 to battery. With the lower winding of the relay 307 energized, armatures 350 and 352 are attracted. The operation of the armature 350 closes an ineffective circuit for the upper winding of the relay 307. The operation of the armature 352 prepares a circuit for the relay 310. During the interval that the relays 409 and 410 at the substation are being deenergized, the relay 315 is deenergized and a circuit is completed extending from the battery by way of the armature 370 and its back contact, armature 352 and its front contact, armature 349 and its back contact, through the winding of the relay 310, and thence to ground. The relay 310 is energized from this circuit and, upon being operated, at armature 357 establishes a locking circuit for itself which extends from battery by way of the front contact and armature 368, the front contact and the armature 357, through the relay 310, and thence to ground. Another result of the operation of the relay 310 is that, at armature 358, a circuit is prepared for energizing the lamp relay 313.

Referring now to the substation, the complete operation of the counting relay 407 causes the circuit of the repeating relay 408 to be opened and, also, a circuit to be prepared for the lower winding of the relay 406. The relay 408, upon being deenergized, opens the circuit of the line relay 316 at the dispatcher's office at armature 462, and at armature 461 completes a circuit which extends from ground by way of the said armature and its back contact, armature 471 and its back contact, armature 477 and its back contact, armature 458 and its front contact, armature 452 and its back contact, through the lower winding of the relay 406, the back contact and armature 475, and thence to battery.

The energization of the lower winding of the relay 406 causes the armatures 450, 451 and 453 to be attracted, whereby a circuit is prepared at armature 451 for the upper winding of the relay 406, and, at armature 453, a circuit is closed for the repeating relay 408. The relay 408, upon being energized, opens the circuit of the lower winding of the relay 406, thereby removing the short-circuit from the upper winding of the said relay at armature 461, and, at armature 462, again completes a circuit for the relay 316, at the dispatcher's office.

The deenergization of the relay 316, at the dispatcher's office, removes the short-circuit from the upper winding of the relay 307 and opens the circuit of the slow-release relay 314. The relay 307 immediately operates its armature 351, thereby preparing a circuit for the lower winding of the counting relay 306. Upon the next energization of the relay 316, the circuit of the relay 314 is completed and a circuit is completed extending from battery by way of the armature 372 and its front contact, armature 351 and its front contact, armature 348 and its back contact, through the lower winding of the relay 306, and thence to battery by way of the front contact and the armature 368. With its lower winding energized, the relay 306 attracts the armatures 347 and 349. By the operation of the armature 347, a circuit is prepared for the upper winding of the said relay. The operation of the armature 349 is without function at the present time.

The removal of the short-circuit from the upper winding of the relay 406 at the substation, previously described, permits this relay to completely attract its armature. This operation opens the circuit of the repeating relay 408 at armature 454, and, at armature 452, prepares a circuit for the third counting relay 405. Upon the deenergization of the relay 408, the circuit of the line relay 316 at the dispatcher's office is opened at armature 462 and, at armature 461, a circuit is completed for the lower winding of the counting relay 405. The energization of the lower winding of the relay 405 attracts its armatures 444, 445 and 447. By the operation of the armature 445, a circuit is prepared for the upper winding of the relay 405. The operation of the armature 444 is without function at this time, as the circuit breaker C—1 is in its open position. The operation of the armature 447 completes a circuit for the repeating relay 408. The operation of the relay 408 again closes the circuit of the relay 316 at the substation and removes the short-circuit from the upper winding of the relay 405, thereby permitting its armatures 443, 446 and 448 to be attracted to extend the operating circuits to the counting relay 404.

Upon the deenergization of the relay 408, which occurs in response to the operation of the relay 405, a circuit is completed for the lower winding of the relay 404. This relay operates to attract its armatures 438, 439 and 441. By this operation, a circuit is prepared for the upper winding of the relay 404, a circuit is completed for the repeating relay 408, and a locking circuit is completed that extends from ground by way of the armature 464 and its front contact, switch 480 in engagement with its resting contacts, back contact and armature 437, armature 438 and its front contact, through the lower winding of the relay 404. and thence to battery by way of the back contact and armature 475. As a result of the completion of this locking circuit, the relay 408 remains energized until after the deenergization of the slow-release relays 409 and 410 for the reasons set forth in the preceding part of the specification.

At the dispatcher's office, the deenergization of the relay 316 causes the operation of the relay 305, which operates completely to prepare a circuit for the lower winding of the relay 304.

Upon the next energization of the relay 316, as described, a circuit is completed extending from ground by way of the armature 372 and its front contact, armature 351 and its front contact, armature 348 and its front contact, armature 345 and its front contact, armature 342 and is back contact, through the lower winding of the relay 304, and thence to battery by way of the front contact and armature 368. With the lower winding of the relay 304 energized, the armature 341 is attracted to prepare a circuit for the upper winding of the said relay, and the armature 343 is operated to open one point in the circuit of the relay 309. After an interval of time, the relay 315 is deenergized, by reason of the fact that the relay 316 is maintained energized by the relay 408 until the relays 409 and 410 at the substation retract their armatures. The deenergization of the relay 315 is without function at the present time.

Referring now to the operation of the apparatus at the substation, upon the deenergization of the relay 410, the short-circuit is removed from the upper winding of the relay 404, and this relay operates to attract its armatures 437, 440 and 442, thereby preparing circuits for the relay 403.

In a manner similar to that already described, the relays 403 and 402 are operated as are the relays 303 and 302 at the dispatcher's office. Of course, in accordance with the position of the circuit breaker C—2, the relay 408 at the substation is energized or deenergized by the pause in the impulsing occurring when the relay 303 or 302 is energized.

Upon the complete operation of the relay 402 at the substation, the circuit of the repeating relay 408 is opened and a circuit is prepared for energizing the relay 401. Upon the deenergization of the relay 408, the circuit of the relay 316 at the dispatcher's office is opened at armature 462 and another circuit is completed which extends from ground at the armature 461, over a circuit previously traced, through the lower winding of the relay 401, and thence to battery by way of the back contact and armature 475. The energization of the lower winding of the relay 401 causes the attraction of the armatures 421, 423 and 490.

The operation of the armature 421 establishes a holding circuit for the lower winding of the relay 401. The operation of the armature 490 completes a circuit for energizing the repeating relay 408. The repeating relay 408, upon energizing, opens the original operating circuit for the lower winding of the relay 401 at armature 461, and, at armature 462, completes a circuit for energizing the relay 316 at the dispatcher's office. The relay 408 remains operated until the relays 409 and 410 at the substation are deenergized.

During this interval, the relay 315 at the substation is deenergized and, as the lower winding of the relay 300 is also energized, in a manner similar to that already described, a circuit is completed extending from battery by way of the armature 370 and its back contact, the armature 352 and its front contact, armature 349 and its front contact, armature 346 and its front contact, armature 343 and its front contact, armature 340 and its front contact, armature 337 and its front contact, armature 331 and its front contact, the front contact and armature 369, and thence to armatures 354, 356 and 358. Depending upon the position of these armatures, a circuit is closed for energizing or deenergizing, as the case may be, the supervisory lamp relays 311, 312 and 313. The operations of these relays change the lamp supervisory signals in accordance with the position of the circuit breakers at the substation.

When the relay 313 is energized, the locking circuit of the relay 105 is so opened that the sending operation is terminated. This provision makes it impossible to secure a false operation, inasmuch as the sending operation is continued in the same manner as above described, until a proper answer-back signal is given to unlock the relay, such as 105.

Referring now to the operation at the substation, the relay 410, upon being deenergized, removes the short-circuit from the upper winding of the relay 401 and permits this relay to completely attract its armatures. As a result thereof, the circuit of the relay 408 is opened and this relay is deenergized. A circuit is then completed for the relay 400 extending from ground by way of armature 461 and its back contact, armature 471 and its back contact, armature 477 and its back contact, armature 458 and its front contact, armature 452 and its front contact, armature 446 and its front contact, armature 440 and its front contact, armature 434 and its front contact, armature 428 and its front contact, armature 422 and its front contact, and, through the winding of the relay 400, to battery.

The relay 400, upon operating, at armature 474 establishes a locking circuit for itself through the switch contacts of all the circuit breakers in series, at armature 477, opens its original energizing circuit, at armature 476 opens the circuit of the slow-release relay 409, at armature 475, opens the locking circuit of all the counting relays 401 to 407, inclusive, and opens the circuit of the relay 470 at armature 473. The construction of the armature 469 at the relay 470 is similar to the construction of the armature 91 of the relay 90, previously described. Consequently, when the circuit of this relay is open, the armature continues to vibrate for an interval of time, thereby sending a series of impulses to the slow-release relay 472. The slow-release relay 472, upon operating, opens one point in a circuit for the lower winding of the first counting relay 407.

When the movement of the armature 469 finally ceases, the circuit of the slow-release relay 472 is opened and this relay is deenergized after an interval of time. As a result of the retraction of the armature 471, a circuit is prepared for the lower winding of the relay 407.

During the interval of time the relay 470 is operating and the relay 472 is energized, the repeating relay 408 is maintained deenergized. As a result of this operation, the line relay 316 at the dispatcher's office remains inoperative sufficiently long to permit the slow-release relay 314 to be deenergized. As a result of this operation, the circuits of the relays 300 to 306, inclusive, are opened, as well as the circuits of the relays 308 to 310.

In the above manner, the apparatus is restored to normal at the end of each sending operation.

It should be noted that, at the termination of the sending operation at the substation, should a circuit breaker then operate under automatic control, the relay 400, which was locked energized, would be immediately deenergized. However, this operation is ineffective to start the sending operation until the slow-release relay 472 is deenergized, which permits a sufficient interval of time to lapse to release the slow-release relay 314 at the dispatcher's office.

In the above manner, the operation of any circuit breaker at the substation causes a signal to be sent back to the dispatcher's office, indicative of the change. At the same time, the position of the other circuit breakers is checked and, if wrong on the supervisory signals, is corrected.

In the same manner as before described, it is possible for the dispatcher to operate any particular circuit breaker at the substation that he desires and receives a signal indicative of the changed condition. It is, of course, obvious that the dispatcher may operate a number of keys simultaneously and that the operations of the units will occur in sequence, depending upon the manner in which the key relays are associated with the counting chain of relays.

In the above operation, it will be seen that, when the dispatcher desires to operate a circuit breaker, the sending operation is not terminated until the answer-back signal is obtained, indicating that the particular circuit breaker desired has completed its operation. When this answer-back signal is received, the sending operation is terminated. In this manner, if the apparatus does not function properly, due to inductive interference, flash-over of insulators, or discharge of lightning arresters, the counting relay chains will not be in synchronism at the final pause and, as a result thereof, the sending operation will recur until the proper circuit breaker is operated at the substation and the proper answer-back signal indicative of its operation is obtained at the dispatcher's office.

My invention is not limited to the particular arrangement of the apparatus described but may be variously modified without departing from the spirit and scope thereof, as set forth in the appended claims.

I claim as my invention:

1. In a supervisory control system, a first station, a second station, a chain of relays at said first station, a chain of relays at said second station, means for operating the chain of relays at said first station in synchronism with said chain of relays at said second station, and at a predetermined rate of speed, apparatus units individual to said relays at said second station, operating keys at said first station individual to said apparatus units, means responsive to the operation of one of said keys for producing a pause in the synchronous operation of said chains of relays and means operative when said pause occurs for operating a selected apparatus unit.

2. In a signalling system, a first station, a second station, a chain of relays at said second station, a chain of relays at said first station, means for operating said chain of relays at said first station sequentially, means responsive to the sequential operation of said chain of relays for transmitting impulses to said second station, means responsive to said impulses at said second station for operating said chain of relays at said second station in synchronism with said relays at said first station, apparatus units at said second station individual to the relays thereat, means at said first station for momentarily checking the sequential operation of said chain of relays at said first station, and means responsive thereto for operating a predetermined one of said apparatus units.

3. In a signalling system, a first station, a second station, apparatus units at said second station, operating means individual thereto at said first station, a chain of relays at said second station, a chain of relays at said first station, selecting relays individual to said apparatus units at said second station, selecting relays individual to said operating means at said first station, means for operating said chains of relays sequentially at a predetermined speed and in synchronism with said relays at said remote station, manually operated means for operating a predetermined one of said selecting relays at said first station, means responsive to said operation for producing a momentary pause in the sequential operation of said chain of relays, means responsive to said pause for energizing the equivalent selecting relay at said second station, and means responsive to said energization of said selecting relay at said remote station for operating the associated apparatus unit.

4. In a supervisory control system, a first station, a second station, a chain of relays at said first station, a chain of relays at said second station, means for operating said chain of relays at said first station in synchronism with the chain of relays at said second station, apparatus units individual to said relays at said second station, operating means at said first station individual to said apparatus units, means responsive to the operation of one of said operating means for momentarily stopping the operation of said chains of relays, means operative when said pause in the operation occurs for selecting one of said apparatus units for operation and means operative following the complete operation of said chains of relays for operating said selected apparatus unit if said chains of relays have operated in synchronism.

5. In a signalling system, a first station, a second station, a chain of relays at said first station, a chain of relays at said second station, means for operating one of said relays at said first station, means responsive to said operation for transmitting an impulse from said first to said second station and for simultaneously conditioning a succeeding relay in said chain for operation, said last mentioned means being rendered inoperative following the conditioning of said succeeding relay for terminating the transmission of said impulse, said first mentioned means being thereupon again operative to energize the succeeding relay in the chain, and means responsive to said impulses for operating the relay chain at the second station in synchronism with that at the first station.

6. In a signaling system, a first station, a second station and a signalling circuit therebetween, a chain of relays at said first station, means for controlling the transmission of impulses over said signalling circuit, means for operating one of said relays in said chain, said impulse-controlling means being responsive thereto for transmitting an impulse over said circuit, means including circuit arrangements responsive to the operation of said impulse-transmitting means for condition the succeeding relay in said chain for operation, said impulse-transmitting means being thereupon rendered non-operative and means responsive to the non-operativeness of said impulse-transmitting means for operating said second relay and simultaneously rendering said impulse-transmitting means operative again.

7. In a signalling system, a first station, a second station, a signalling circuit therebetween, a chain of relays at said first station, means for controlling the transmission of impulses over said signalling circuit, means for operating one of said relays in said chain, said impulse-controlling means being responsive thereto for transmitting an impulse over said circuit, means including circuit arrangements responsive to the operation of said impulse-transmitting means for conditioning the succeeding relay in said chain for operation, said impulse-transmitting means being thereupon rendered non-operative, and means responsive to the non-operativeness of said impulse-transmitting means for operating said second relay and simultaneously rendering said impulse-transmitting means operative again, a second station, a chain of relays at said second station, means responsive to the impulse received for operating one of said relays in said chain at said second station and means operative following the termination of said impulse for conditioning the succeeding relay in said chain for operation.

8. In a signalling system, a first station, a chain of relays at said station, an impulse-transmitting means, and means including circuit connections from said chains of relays to said impulse-transmitting means for operating said impulse-transmitting means in response to the operation of any one of said relays, means including circuit connections responsive to the operation of said impulse-transmitting means for conditioning the succeeding relay in said chain for operation and means responsive to said conditioning of said succeeding relays for rendering said impulse-transmitting means non-operative.

9. In a signalling system, a station, a signalling circuit, a plurality of relays at said station, means for operating one of said relays, means responsive to the operation of said relay for transmitting an impulse over said signalling circuit, and for conditioning the succeeding relay in said chain for operation, and means responsive to the conditioning of said relay for terminating the transmission of said impulse and for operating said succeeding relay.

10. In a signalling system, a first station, a signalling circuit, a chain of relays at said station, an impulse-transmitting means, means including circuit connections from said chains of relays to said impulse-transmitting means for operating said impulse-transmitting means in response to the operation of any one of said relays, means including circuit connections responsive to the operation of said impulse-transmitting means for conditioning the succeeding relay in said chain for operation, means responsive to said conditioning of said succeeding relay for rendering said impulse-transmitting means non-operative, a second station connected to said signalling circuit, a chain of relays at said second station, means responsive to the received impulse for operating one of said relays in said chain, and means responsive to the termination of said impulse for conditioning the succeeding relay of said chain for operation.

11. In a supervisory control system, a chain of relays each having a plurality of windings, a second chain of relays comprising relays individual to each of said first relays, means responsive to an impulse for energizing one of the windings of a relay in the first-mentioned chain, means including circuit connections responsive to the termination of the impulse for energizing the second winding of the relay, and means operative in response to the energization of said second winding to prepare an energizing circuit for the associated relay in said second chain individual to said first-mentioned relay.

12. In a supervisory control system, a chain of relays each having a plurality of windings, a second chain of relays comprising relays individual to each of said first-mentioned relays, means responsive to an impulse for energizing one of the windings of a relay in the first-mentioned chain and means including circuit connections responsive to the termination of the impulse for energizing the second winding of said relay, means operative in response to the energization of said second winding for preparing an energizing circuit for the associated relay in said second chain individual to said first-mentioned relay, and means responsive to the energization of said second winding, including circuit connections, for preparing the succeeding relay in said first chain for energization in response to the succeeding impulse.

13. In a supervisory control system, a first station, a second station, a chain of relays at each of said stations, means for operating said chain of relays at said first station in synchronism with the chain of relays at said second station, apparatus units individual to said relays at said second station, operating means at said first station individual to said apparatus units, means responsive to the operation of a plurality of said operating means for momentarily stopping the operation of said chains of relays a plurality of times, means operative when said pauses in the operation occur for selecting a plurality of said apparatus units for operation and means operative following the complete operation of said chains of relays for operating said selecting apparatus units.

In testimony whereof, I have hereunto subscribed my name this 14th day of November, 1923.

ROY J. WENSLEY.